UNITED STATES PATENT OFFICE.

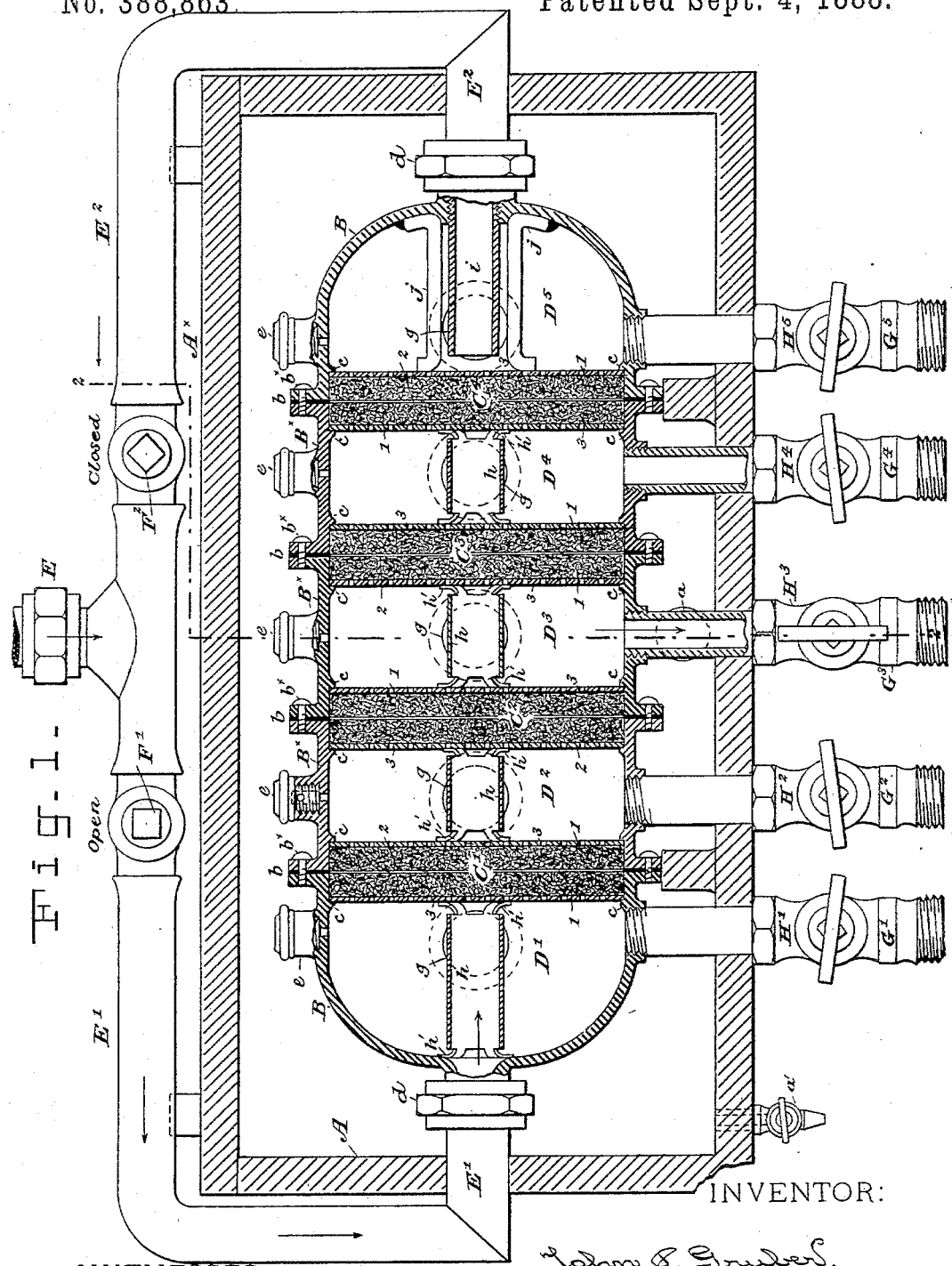

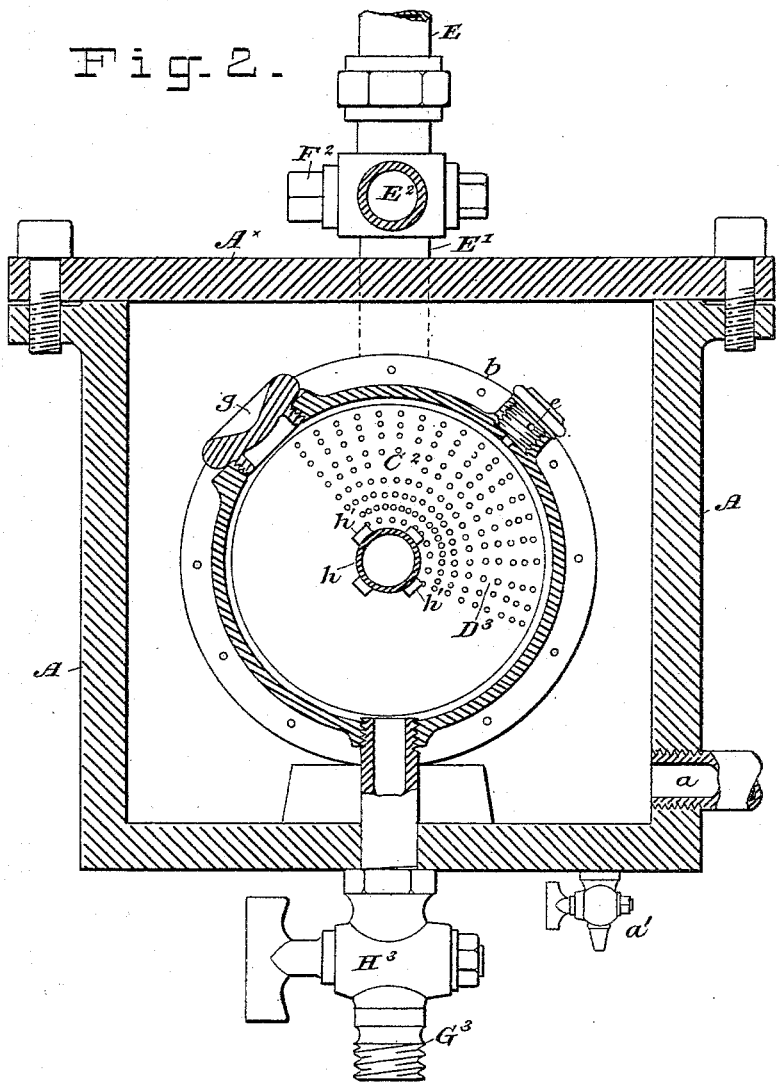

JOHN P. GRUBER, OF JERSEY CITY, NEW JERSEY.

FILTER.

SPECIFICATION forming part of Letters Patent No. 388,863, dated September 4, 1888.

Application filed October 24, 1887. Serial No. 253,184. (No model.)

*To all whom it may concern:*

Be it known that I, JOHN P. GRUBER, a citizen of the United States, and a resident of Jersey City, in the county of Hudson and State of New Jersey, have invented certain new and useful Improvements in Filters, of which the following is a specification.

My invention relates to that class of filters which have a series of filtering-diaphragms alternating with chambers and have outlets from the several chambers, whereby the liquid to be filtered may be made to pass through one or more of said diaphragms at will and in either direction, as desired; and the main object of my invention is to provide means for more thoroughly washing and cleaning out the end and intermediate chambers of the filter and for bracing and holding the diaphragms in position in the shell or casing of the filter. My object is also to provide means for conveniently removing any one of the several diaphragms without disturbing the others.

My invention will be fully described hereinafter, and its novel features carefully defined in the claim.

In the drawings which serve to illustrate my invention, Figure 1 is a longitudinal axial section of a filter embodying my invention; and Fig. 2 is a transverse section of same, taken in the plane indicated by line 2 2 in Fig. 1.

In the drawings I have shown the filter mounted in a steam-box, A, provided with a removable cover, $A^x$. In filtering liquids which become thick or stiff under the influence of cold it is very desirable in any case, and often necessary, that the liquid shall be kept quite warm or even hot while being filtered. Therefore I find it convenient to mount the filter in a steam-box of some kind, to which steam may be admitted for heating the filter and its contents. Any kind of steam-box may be used. In the present case I have shown a simple rectangular cast-iron box provided with a steam-inlet, $a$, and an outlet, $a'$, for water of condensation. In lieu of steam, hot water may be employed, and in some cases this may be preferable to steam. The box A may have any suitable form of inlet and outlet for the water or steam.

The filter-casing is composed of two end sections, B B, and any number of intermediate drum-like sections, $B^x$ $B^x$. In the present case I have shown three intermediate sections. The several sections are provided with flanges $b$ $b$, whereby they are joined together by means of screws $b^x$, packing-rings being employed to make the joints tight. On the inner faces of the sections of the casing are formed flanges $c$ $c$, and when the sections are joined together these flanges embrace and clamp the several filtering-diaphragms $C'$ $C^2$ $C^3$ $C^4$, arranged at the joints between the said sections, as shown. I do not limit myself to any particular materials for these diaphragms, as filtering materials for this purpose are well known. I usually employ, however, two thicknesses of felt, 1 1, with a sheet of filtering-paper, 2, between them, and the whole embraced between two plates of perforated metal, 3 3.

In order to remove either one of the diaphragms without disturbing the others, it is only necessary to remove the screws $b^x$ at the joint where the diaphragm is placed. The sectional construction of the shell or casing permits this removal.

The filtering-diaphragms divide the space within the casing up into capacious filtering-chambers $D'$, $D^2$, $D^3$, $D^4$, and $D^5$, the first and last being terminal or end chambers. The liquid comes to the filter by a pipe, E, which has two branches, $E'$ and $E^2$, leading, respectively, to end chambers, $D'$ and $D^5$, the connections with the casing being effected by unions $d$ $d$. Branch $E'$ is controlled by a cock, $F'$, and branch $E^2$ by a cock, $F^2$. From the several chambers of the filter the liquid is drawn off by pipes $G'$, $G^2$, $G^3$, $G^4$, and $G^5$, controlled, respectively, by cocks $H'$, $H^2$, $H^3$, $H^4$, and $H^5$.

On each chamber of the filter is an air-valve, $e$; but as these are identical with those illustrated in my patent, No. 353,855, and operate in the same way and for the same purpose, it will not be necessary to describe them more minutely here.

The operation is as follows: Suppose it be desired to pass the liquid through but two filtering-diaphragms. All the outlet-cocks but cock $H^3$ are closed and either cock $F'$ or cock $F^2$ opened. In Fig. 1 I have shown cock $F'$ open and the liquid flowing through pipe $E'$ to chamber $D'$, thence through filtering-diaphragm $C'$ into chamber $D^2$, thence through filtering-diaphragm $C^2$ into chamber $D^3$, and thence out at outlet $G^3$. At any time cock $F'$ may be closed and cock $F^2$ opened, when the liquid will flow through diaphragms $C^3$ and $C^4$ to the outlet $G^3$; or both cocks $F'$ and $F^2$ might be opened, and the flow would then be in both directions to outlet $G^3$. If cock $F'$ be left open, as in Fig. 1, and outlet-cock $G^5$ be opened, (instead of $G^3$,) then the liquid will be compelled to pass through all the diaphragms to reach the outlet, and the liquid may be made to pass through one or all of the diaphragms in either direction by merely manipulating the inlet and outlet cocks, as will be understood by simple inspection of Fig. 1.

Chamber $D'$ may be flushed by admitting water under pressure through pipe E and branch $E'$, the outlet-cock $H'$ of this chamber being opened to allow the water to flow off, and the chamber $D^5$ may be flushed in a similar manner.

The filtering chambers are each provided with a flushing-aperture closed by a plug, $g$, (see Fig. 2,) for the introduction of a nozzle for admitting water under pressure to flush or wash said chambers. The waste water flows off at the pipes $G'$ $G^2$, &c. This construction provides for a flow of water through each chamber—the end as well as the intermediate chambers—and the flushing-apertures are or may be made large enough to serve as hand holes for cleaning where the filter is of large size.

The air-valves $e$ and the flushing apertures may be arranged in either of the positions illustrated—that is to say, as shown in Fig. 2 or as shown in Fig. 1. In Fig. 1 the air-valves are on the top or crown of the filter and the apertures at the side thereof. The arrangement of these devices will, in fact, be governed by circumstances, and they will be placed wherever they will be most convenient of access.

The position of the outlets $G'$ $G^2$, &c., may also be varied to suit the convenience of the user—that is, they need not necessarily be arranged to discharge downward.

In order to brace and support the diaphragms, I arrange within the intermediate chambers tubular braces $h$, on the ends of which are feet $h'$, which rest on the faces of the diaphragms. These braces do not appreciably impede the flow of the liquid, being hollow and open for its passage, and they are at the same time quite stiff and unyielding.

In the end chambers, $D'$ $D^5$, the diaphragm may be braced in the same way as in the intermediate chambers. This is shown at the left in Fig. 1, where a tubular brace, $h$, with feet $h'$, in chamber $D'$ is represented as bearing at one end against the diaphragm and at the other end against the chamber-wall; or each end chamber may be provided like chamber $D^5$, as seen at the right in Fig. 1, where an inlet pipe or nozzle, $i$, from branch $E^2$ is made to extend inward nearly to diaphragm $C^4$ and braces $jj$ are arranged at each side thereof. I have shown two forms of these bracing devices; but either or any equivalent device may be used. I have shown the sections of the casing provided with exterior flanges and connected by screws; but any known means of securing them together may be employed.

Valves may be employed for controlling the inlets and outlets of the filter in lieu of cocks, and large valves would be preferable, perhaps, where the liquids to be filtered are naturally thick or viscid.

In Fig. 2 I have not shown all the perforations in the plate 3 of the filtering-diaphragm. It will be understood that these plates 3 are merely disks of perforated sheet metal.

Having thus described my invention, I claim—

In a filter, the combination, with a casing composed of the externally and internally flanged sections, as B and $B^\times$, of filtering-diaphragms, as $C'$ $C^2$, clamped between the inner flanges on the adjacent sections, and the stiff braces arranged between the said diaphragms and between the terminal diaphragms and the ends of the casing, said casing being provided with inlets and outlets, substantially as set forth.

In witness whereof I have hereunto signed my name in the presence of two subscribing witnesses.

JOHN P. GRUBER.

Witnesses:
HENRY CONNETT,
J. D. CAPLINGER.